(12) United States Patent
Seiler et al.

(10) Patent No.: US 10,997,380 B2
(45) Date of Patent: May 4, 2021

(54) WIRELESS PAIRING USING RADIO FREQUENCY IDENTIFICATION COMMUNICATIONS

(71) Applicant: HEWLETT-PACKARD DEVELOPMENT COMPANY, L.P., Spring, TX (US)

(72) Inventors: Peter Seiler, Fort Collins, CO (US); Justin Barth, Fort Collins, CO (US); Lauren Domingo, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/348,676

(22) PCT Filed: Feb. 3, 2017

(86) PCT No.: PCT/US2017/016503
§ 371 (c)(1),
(2) Date: May 9, 2019

(87) PCT Pub. No.: WO2018/144015
PCT Pub. Date: Aug. 9, 2018

(65) Prior Publication Data
US 2019/0347453 A1    Nov. 14, 2019

(51) Int. Cl.
*G06K 7/10*     (2006.01)
*H04W 12/00*    (2021.01)
(Continued)

(52) U.S. Cl.
CPC .......... *G06K 7/10366* (2013.01); *H04W 4/80* (2018.02); *H04W 12/003* (2019.01); *H04W 76/10* (2018.02)

(58) Field of Classification Search
CPC .......... G06K 7/10366; G06K 7/10376; G06K 7/10386; H04B 5/02; H04B 5/0062;
(Continued)

(56) References Cited

U.S. PATENT DOCUMENTS

| 7,530,498 | B2 |   | 5/2009 | Wiklof et al. |
| 8,666,313 | B2 | * | 3/2014 | Preston ............... H04W 12/003 455/41.1 |

(Continued)

OTHER PUBLICATIONS

Piltch, A., vWand Hands-On: Bluetooth Pen Adds NFC to Any Device, Feb. 27, 2013, < http://www.laptopmag.com/articles/vwand-hands-on-bluetooth-pen-adds-nfc-to-any-device >.

*Primary Examiner* — Thien M Le
*Assistant Examiner* — April A Taylor
(74) *Attorney, Agent, or Firm* — Tong Rea Bentley & Kim LLC

(57) ABSTRACT

In an example, radio frequency identification communications is used to pair a wireless device and a host computing system for communications over a non-radio frequency identification communications protocol. The wireless device includes a radio frequency identification reader that extracts pairing information from a radio frequency identification tag of the host computing system. The wireless device may then automatically initiate pairing with the host computing system using the pairing information, without further input from a user of the wireless device. A connection is then established between the wireless device and the host computing system using a non-radio frequency identification wireless communication protocol. The connection facilitates an exchange of data between the wireless device and the host computing system.

20 Claims, 3 Drawing Sheets

(51) Int. Cl.
*H04W 4/80* (2018.01)
*H04W 76/10* (2018.01)

(58) Field of Classification Search
CPC ..... H04W 4/80; H04W 12/00; H04W 12/003;
H04W 12/00305; H04W 12/00407
See application file for complete search history.

(56) References Cited

U.S. PATENT DOCUMENTS

| | | | |
|---|---|---|---|
| 8,823,494 B1 | 9/2014 | Kovitz et al. | |
| 9,189,084 B2 | 11/2015 | Hicks et al. | |
| 9,408,022 B1 | 8/2016 | O'Gwynn | |
| 9,785,261 B2* | 10/2017 | Konanur | G06K 9/00087 |
| 9,924,019 B2* | 3/2018 | Jeganathan | G06F 3/03545 |
| 10,321,501 B2* | 6/2019 | Liu | H04B 5/02 |
| 10,606,406 B2* | 3/2020 | Park | G06F 3/0481 |
| 2005/0104870 A1* | 5/2005 | Jurisch | G06K 7/10881 |
| | | | 345/179 |
| 2008/0057868 A1* | 3/2008 | Chang | H04B 17/318 |
| | | | 455/41.2 |
| 2013/0091238 A1* | 4/2013 | Liu | H04W 76/10 |
| | | | 709/217 |
| 2014/0061306 A1* | 3/2014 | Wu | G06K 19/0727 |
| | | | 235/439 |
| 2014/0256250 A1 | 9/2014 | Cueto et al. | |
| 2015/0331501 A1 | 11/2015 | Nicholson et al. | |
| 2016/0179223 A1 | 6/2016 | Konanur et al. | |
| 2016/0261974 A1* | 9/2016 | Arrizza | H04L 67/12 |
| 2016/0309533 A1* | 10/2016 | Dua | H04L 12/2816 |

* cited by examiner

WIRELESS PAIRING USING RADIO FREQUENCY IDENTIFICATION COMMUNICATIONS

BACKGROUND

Wireless pairing enables two or more devices to exchange data wirelessly over a short distance. For instance, wireless pairing may be used to enable a wireless headset to play audio from a mobile phone, or to allow a wireless mouse to control a graphical user interface of a computer.

DETAILED DESCRIPTION

The present disclosure broadly describes an apparatus, method, and non-transitory computer-readable medium for wireless pairing using radio frequency identification communications. As discussed above, wireless pairing enables two or more devices to exchange data wirelessly over a short distance. Many of the most widely used wireless communications protocols, such as the BLUETOOTH protocol, pair two devices through a series of manual steps. For instance, the initial discovery of candidate BLUETOOTH devices with which a host device may pair may be a user-initiated manual process. Moreover, once a candidate device is discovered, the user may manually provide unique data to the host and/or candidate devices to authenticate the pairing. The unique data may include, for example, a numerical code or passkey. The manual entry of the unique data is meant to ensure that the host device does not pair with an unintended device.

Examples of the present disclosure use radio frequency identification communications to automatically establish wireless pairing between devices. For instance, a host computing system may include a built-in radio frequency identification (RFID) tag that encodes pairing information for the host computing system, such as a broadcast identifier or other information. A wireless device, such as a stylus or other device, may include a built-in RFID reader that is capable of reading the pairing information encoded in the RFID tag of the host computing system. Thus, pairing between the wireless device and the host computing system may be initiated simply by bringing the wireless device within range of the RFID tag so that the wireless device may read the pairing information. Once paired, the wireless device and the host computing system can exchange data via a peer-to-peer connection using any wireless communication protocol, including non-radio frequency identification protocols such as the BLUETOOTH protocol.

Figure 1:
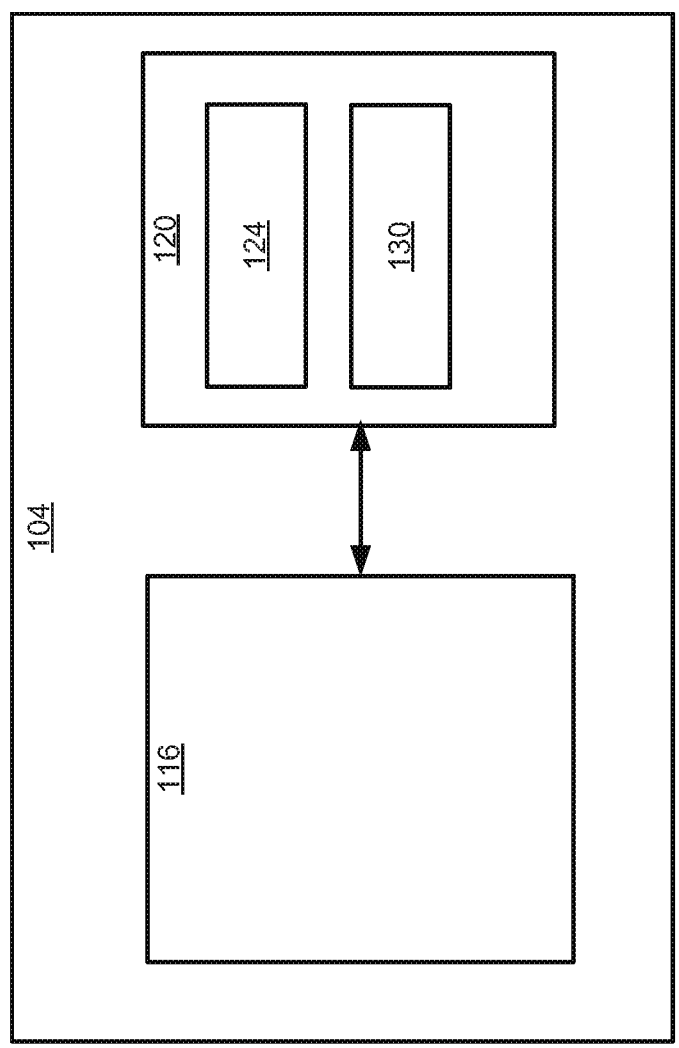
FIG. 1 depicts a high-level block diagram of example wireless device that can be transformed into a machine capable of performing the functions described herein.

FIG. 1 depicts a high-level block diagram of example wireless device 104 that can be transformed into a machine capable of performing the functions described herein. In one example, the wireless device 104 is a wireless stylus or pen that is configured to communicate with one or more host computing systems (or with one or more input/output devices of a host computing system, such as one or more monitors of a host computing system including multiple monitors).

As illustrated, the wireless device 104 generally comprises a plurality of input/output (I/O) devices 120, including at least a radio frequency identification (RFID) reader 124 and a wireless communication device 130 (e.g., an network interface controller (NIC) card, an antenna, or the like), and a processor 116 that cooperates with the I/O devices 120 to establish a wireless connection between the wireless device 104 and a host computing system.

In particular, and as discussed in greater detail below, the RFID reader 124 extracts pairing information from an RFID tag embedded in the host computing system. The processor 116 automatically (e.g., without further manual intervention from a user) initiates pairing of the wireless device 104 with the host computing system, using the extracted pairing information. The wireless communication device 130 then establishes a connection between the wireless device 104 and the host computing system, using a non-radio frequency identification wireless communication protocol.

Figure 2:
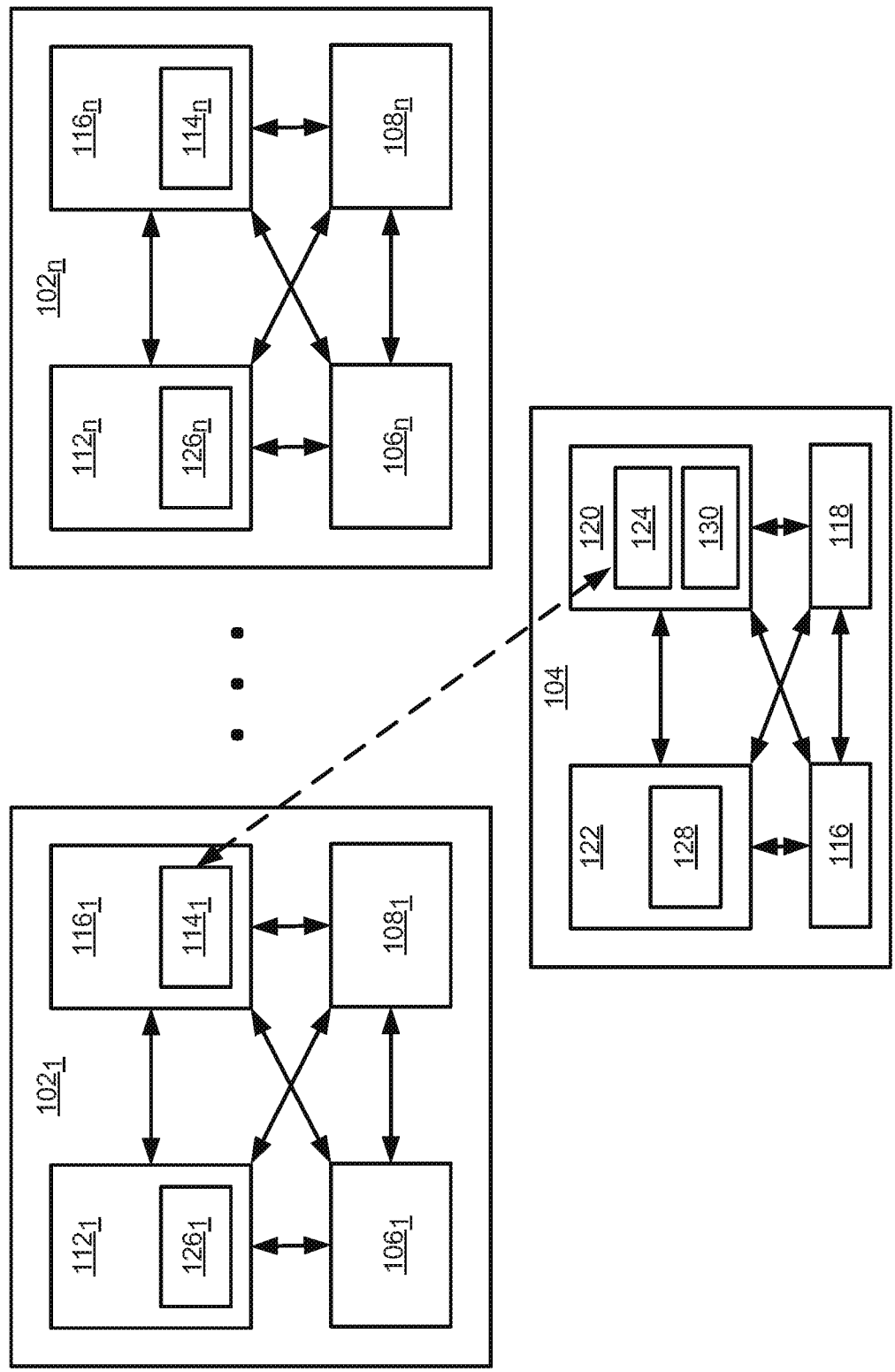
FIG. 2 depicts a high-level block diagram of example host computing systems and an example wireless device that can be transformed into machines capable of performing the functions described herein.

FIG. 2 depicts a high-level block diagram of example host computing systems $102_1$-$102_n$ (hereinafter collectively referred to as "host computing systems 102") and an example wireless device 104 that can be transformed into machines capable of performing the functions described herein. Notably, no computer or machine currently exists that performs the functions as described herein. As a result, the examples of the present disclosure modify the operation and functioning of a general-purpose computer to allow the user of a wireless device to easily pair the wireless device with a host computing system, as disclosed herein.

As depicted in FIG. 2, each host computing system 102 comprises a respective hardware processor element $106_1$-$106_n$ (hereinafter collectively referred to as "processors 106"), e.g., a central processing unit (CPU), a microprocessor, or a multi-core processor, a respective memory $108_1$-$108_n$ (hereinafter collectively referred to as "memories 108"), e.g., a temporary memory such as random access memory (RAM) and/or read only memory (ROM), a respective pairing module $112_1$-$112_n$ (hereinafter collectively referred to as "pairing modules 112") for pairing the host computing system 102 with a wireless device, and respective sets of various input/output (I/O) devices $110_1$-$110_n$ (hereinafter collectively referred to as "I/O devices 110"), e.g., storage devices, including but not limited to, one or more of: a tape drive, a floppy drive, a hard disk drive or a compact disk drive, a receiver, a transmitter, an antenna, a speaker, a display, a speech synthesizer, an output port, an input port and a user input device, such as a keyboard, a keypad, a mouse, a microphone, and the like.

In the example illustrated in FIG. 2, the I/O devices 110 include at least one associated RFID tag $114_1$-$114_n$ (hereinafter collectively referred to as "RFID tags 114") that encodes pairing information for the respective host computing system 102, such as a broadcast identifier, personal identification number (PIN) code, or other information that is unique to the host computing system 102. The encoded pairing information, when exchanged with another computing device such as the wireless device 104, facilitates pairing of the host computing system 102 with the other computing device, as discussed in greater detail below. In one example, one or more of the RFID tags 114 is a pre-programmed passive RFID tag (e.g., does not write anything to the host computing system 102). In this case, the radio frequency communication channel between the wireless device 104 and the host computing system 102 is one-way (i.e., host computing system 102 to wireless device 104).

Although one processor element is shown for each host computing system 102, it should be noted that any of the host computing systems 102 may employ a plurality of processor elements. Furthermore, a hardware processor can be utilized in supporting a virtualized or shared computing environment. The virtualized computing environment may support a virtual machine representing computers, servers, or other computing devices. In such virtualized virtual machines, hardware components such as hardware processors and computer-readable storage devices may be virtualized or logically represented.

In further examples, a single host computing system 102 may include multiple display devices (e.g., multiple monitors), where each display device includes a unique RFID tag 114 that allows a wireless device (such as the wireless device 104) to selectively pair with one of the display devices at a time. In this case, the wireless device 104 may signal the processor of the host computing system 102 to indicate which display device it has detected/wishes to pair with.

It should be noted that the present disclosure can be implemented by machine readable instructions and/or in a combination of machine readable instructions and hardware, e.g., using application specific integrated circuits (ASIC), a programmable logic array (FLA), including a field-programmable gate array (FPGA), or a state machine deployed on a hardware device, a host computing system or any other hardware equivalents, e.g., computer readable instructions pertaining to the method(s) discussed below can be used to configure a hardware processor to perform the blocks, functions and/or operations of the below disclosed methods.

In one example, instructions and data for the present modules or processes 112 for wireless pairing, e.g., machine readable instructions can be loaded into memory 108 and executed by hardware processor element 106 to implement the blocks, functions or operations as discussed below in connection with the methods 300 and 400. For instance, the modules 112 may include one or more programming code components, including a peer-to-peer component 126$_1$-126$_n$ (hereinafter collectively referred to as "peer-to-peer components 126"). The peer-to-peer components 126 may be configured to initiate and maintain a peer-to-peer connection with the wireless device 104 using a non-radio frequency identification wireless communication protocol, for example as discussed in connection with FIGS. 3-4.

Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the below described method(s) can be perceived as a programmed processor or a specialized processor. As such, the present modules 112 for wireless pairing, including associated data structures, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer.

The wireless device 104 illustrated in FIG. 2 is a more detailed version of the wireless device 104 illustrated in FIG. 1. As such, the same reference numerals are used to identify components of the wireless device 104 that are illustrated in both of FIGS. 1 and 2. Similar to the host computing systems 102, one example of a wireless device 104 also comprises a hardware processor element 116, a memory 118, a pairing module 122 for pairing the wireless device 104 with one of the host computing systems 102, and various input/output (I/O) devices 120, e.g., storage devices, including but not limited to, one or more of: a tape drive, a floppy drive, a hard disk drive or a compact disk drive, a receiver, a transmitter, an antenna, a speaker, a display, a speech synthesizer, an output port, an input port and a user input device, such as a keyboard, a keypad, a mouse, a microphone, and the like. The types of I/O devices incorporated into the wireless device 104 may depend on the type of the wireless device (e.g., whether the wireless device is a stylus, a headset, or other type of device). In the example illustrated in FIG. 1, the I/O devices 120 include an RFID reader 124 that is capable of reading pairing information encoded in the RFID tags 114 of the host computing systems 102 (or in an RFID tag 114 embedded in an I/O device 116 of a host computing system 102, such as a monitor of a multiple monitor display). The I/O devices 120 also include a wireless communication device 130 for establishing a wireless connection between the wireless device 104 and one of the host computing systems 102.

Although one processor element is shown, it should be noted the wireless device 104 may employ a plurality of processor elements. Furthermore, a hardware processor can be utilized in supporting a virtualized or shared computing environment. The virtualized computing environment may support a virtual machine representing computers, servers, or other computing devices. In such virtualized virtual machines, hardware components such as hardware processors and computer-readable storage devices may be virtualized or logically represented.

The present disclosure can be implemented by machine readable instructions and/or in a combination of machine readable instructions and hardware, e.g., computer readable instructions pertaining to the method(s) discussed below can be used to configure a hardware processor to perform the blocks, functions and/or operations of the below disclosed methods. In one example, instructions and data for the present module or process 122 for wireless pairing, e.g., machine readable instructions can be loaded into memory 118 and executed by hardware processor element 116 to implement the blocks, functions or operations as discussed below in connection with the methods 300 and 400. For instance, the module 122 may include one or more programming code components, including a peer-to-peer component 128. The peer-to-peer component 128 may be configured initiate and maintain a peer-to-peer connection with a host computing system 102 using a non-radio frequency identification wireless communication protocol, for example as discussed in connection with FIGS. 3-4.

Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the below described method(s) can be perceived as a programmed processor or a specialized processor. As such, the present module 122 for wireless pairing, including associated data structures, of the present disclosure can be stored on a tangible or physical (broadly non-transitory) computer-readable storage device or medium. More specifically, the computer-readable storage device may comprise any physical devices that provide the ability to store information such as data and/or instructions to be accessed by a processor or a computing device such as a computer.

Figure 3:
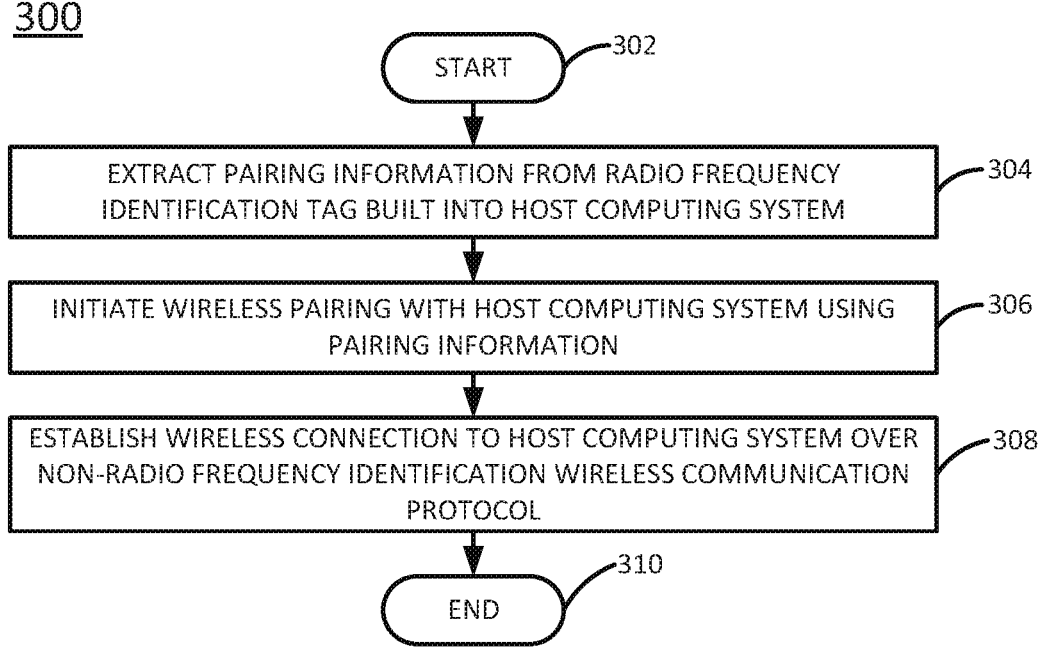
FIG. 3 illustrates a flow diagram of a method for pairing a wireless device with a host computing system.

FIG. 3 illustrates a flow diagram of a method 300 for pairing a wireless device with a host computing system. The method 300 may be performed, for example, by wireless device 104 of FIGS. 1-2. As such, reference may be made in the discussion of the method 300 to components of the wireless device 104 and/or the host computing systems 104 of FIGS. 1-2. However, such references are made for the sake of example, and are not intended to be limiting.

The method 300 begins in block 302. In block 304, the RFID reader 124 extracts pairing information from the RFID tag 114 of one of the host computing systems 102. The host computing system 102 may be a standalone computing system, or it may be an I/O device (e.g., a monitor of a multiple-monitor configuration) of a computing system. The pairing information may comprise a broadcast identifier, personal identification number (PIN) code, or other information that is unique to the host computing system 102. In one example, the pairing information may be stored in a memory (e.g., memory 118) of the wireless device 104 to facilitate future pairing events.

In block 306, the processor 116, in conjunction with a communication device (e.g., an antenna, a network interface controller, or other device) of the I/O devices 120, initiates paring of the wireless device 104 with the host computing system 102 using the pairing information. In one example, this is done without any further manual input from a user of the wireless device 104 or host computing system 102.

In block 308, the processor 116, in conjunction with the communication device of the I/O devices 120, establishes a wireless connection (e.g., a peer-to-peer connection) over a network (e.g., a piconet), between the wireless device 104 and the host computing system 102. The wireless connection facilitates the exchange of data between the wireless device 104 and the host computing system 102. In one example the wireless connection is established using a communication protocol other than radio frequency identification. For instance, the wireless connection may be established via the BLUETOOTH protocol, WiFi, the Wireless Gigabit Alliance (WiGig) protocol, a near-field communications protocol, or other wireless communication protocol.

The method 300 ends in block 310.

Figure 4:
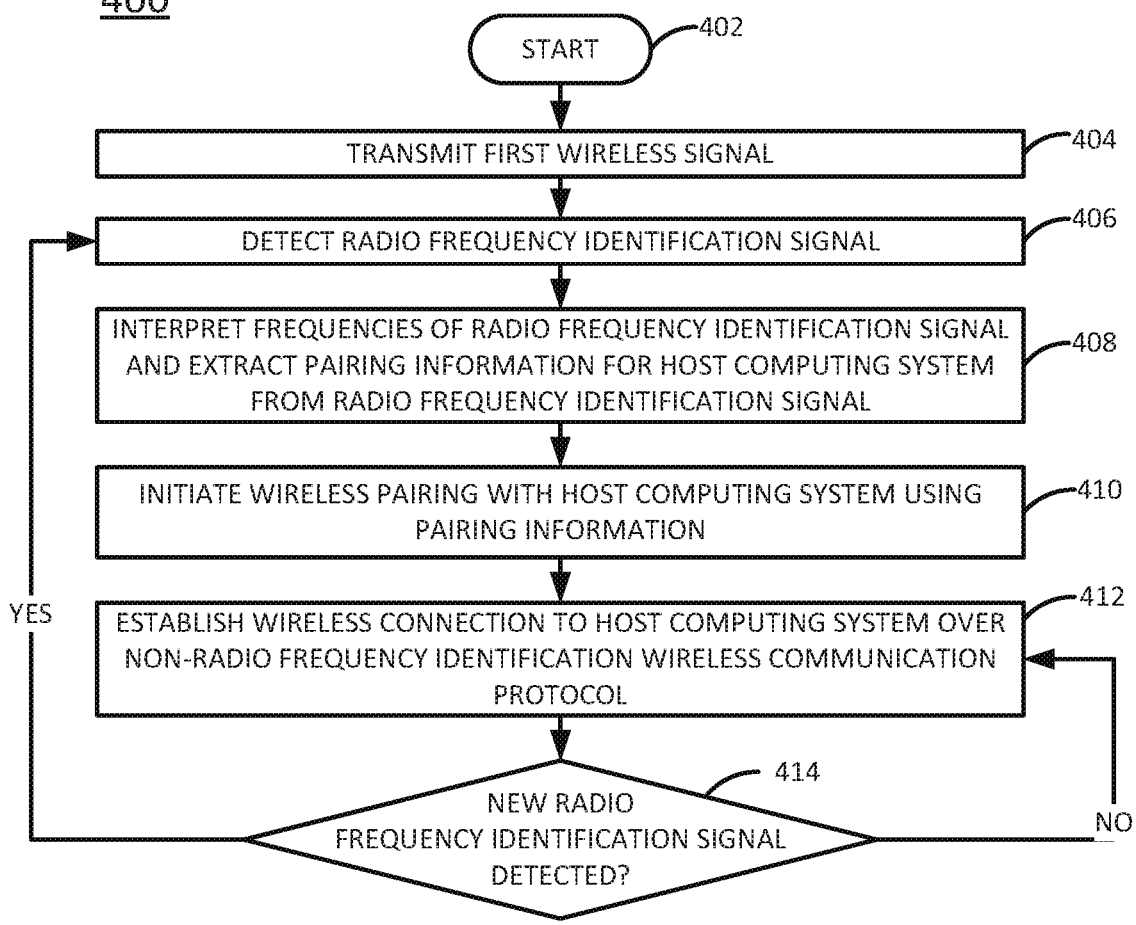
FIG. 4 illustrates a flow diagram of another method for pairing a wireless device with a host computing system. In one example, the method is a more detailed version of the method.

FIG. 4 illustrates a flow diagram of another method 400 for pairing a wireless device with a host computing system. In one example, the method 400 is a more detailed version of the method 300. Thus, the method 400 may be performed by the wireless device 104 of FIGS. 1-2. As such, reference may be made in the discussion of the method 400 to components of the wireless device 104 or host computing systems 102 of FIGS. 1-2. However, such references are made for the sake of example, and are not intended to be limiting.

The method 400 begins in block 402. In block 404, the wireless device 104 transmits (e.g., via an antenna) a first wireless signal (e.g., radio waves) for radio frequency identification. In one example, the first signal is a discovery signal intended to locate any RFID-enabled devices within range that may pair with the wireless device 104, In one example, the first wireless signal is transmitted continuously by the wireless device 104, or is automatically transmitted on a periodic basis.

In block 406, the wireless device's RFID reader 124 detects (e.g., via an antenna) a second RF signal responding to the first signal transmitted in block 404. In one example, the wireless device's antenna may listen for RF response signals, and the second signal may be detected when the wireless device 104 is physically moved (e.g., by a user) within range of an RFID tag 114 built into a first host computing system $102_1$. The first host computing system $102_1$ may be a standalone computing system, or it may be an I/O device (e.g., a monitor of a multiple-monitor configuration) of a computing system.

In block 408, the RFID reader 124 may operate in conjunction with the processor 116 to interpret the frequencies of the second RF signal detected in block 406 and to extract pairing information from those frequencies. For instance, the extracted pairing information might comprise a broadcast identifier, a personal identification number (PIN) code, or other information that is unique to the first host computing system $102_1$. In one example, the pairing information may be stored in a memory (e.g., memory 118) of the wireless device 104 to facilitate future pairing events.

In block 410, the processor 116 may operate in conjunction with a communication device of the I/O devices 120 to initiate pairing of the wireless device 104 with the first host computing system $102_1$. The pairing process may involve, for example, contacting the first host computing system $102_1$ using the pairing information extracted in block 308 to provide similar information for the wireless device 104 and to request a connection.

In block 412, the wireless device 104 and the first host computing system $102_1$ establish a connection (e.g., a peer-to-peer connection) over a wireless network to facilitate the exchange of data. In one example, the wireless network is a piconet. In one example, the wireless device 104 and the first host computing system $102_1$ may use any non-radio frequency identification wireless communication protocol to establish this connection. For instance, the wireless connection may be established via the BLUETOOTH protocol, WiFi, the Wireless Gigabit Allinance (WiGig) protocol, a near-field communications protocol, or other wireless communication protocol.

In block 414, the RFID reader 124 of the wireless device 104 determines whether a new or third RF signal has been detected responding to the first RF signal transmitted in block 404. For instance, if the wireless device 104 has been moved within range of a second host computing system $102_n$ that has its own built-in RFID tag, the third RF signal may be broadcast by the RFID tag of the second host computing system $102_n$.

If the RFID reader 124 concludes in block 414 that no new or third RFID signal has been detected, the method 400 returns to block 412, and the wireless connection between the wireless device 104 and the first host computing system $102_1$ is maintained. Thus, the wireless device 102 may continue to exchange data with the first host computing system $102_1$.

If, however, the RFID reader 124 concludes in block 414 that a third RFID signal has been detected, then the method 400 returns to block 408 and proceeds as described above to extract pairing information for and establish a wireless connection with the second host computing system $102_n$. In one example, establishing the wireless connection with the second host computing system $102_n$ includes first terminating the wireless connection with the first host computing system $102_1$, so that the wireless device 104 is paired with no more than one host computing system 102 at a time.

Thus, the wireless device 104 can be easily paired and re-paired with one or more host computing systems 102 simply by moving the wireless device within range of the host computing systems' RFID tags. The process takes place largely without any human intervention, except for the physical movement of the wireless device 104.

It should be noted that although not explicitly specified, some of the blocks, functions, or operations of the methods 300 and 400 described above may include storing, displaying and/or outputting for a particular application. In other words, any data, records, fields, and/or intermediate results discussed in the methods can be stored, displayed, and/or outputted to another device depending on the particular application. Furthermore, blocks, functions, or operations in FIGS. 3-4 that recite a determining operation, or involve a decision, do not imply that both branches of the determining operation are practiced. In other words, one of the branches of the determining operation may not be performed, depending on the results of the determining operation.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. A method, comprising:
   extracting, by a radio frequency identification reader of a wireless device, pairing information from a first radio frequency identification tag of a first host computing system;
   initiating, by the wireless device, pairing of the wireless device with the first host computing system using the pairing information, without further input from a user of the wireless device; and
   establishing a connection between the wireless device and the first host computing system using a non-radio frequency identification wireless communication protocol to facilitate an exchange of data between the wireless device and the first host computing system,
   wherein the radio frequency identification tag is embedded in a first display device of a plurality of display devices coupled to the first host computing system, and the pairing pairs the wireless device with the first display device.

2. The method of claim 1, wherein the pairing information comprises a broadcast identifier for the first host computing system.

3. The method of claim 1, wherein the extracting is triggered by the wireless device being moved within a range of the first radio frequency identification tag.

4. The method of claim 1, further comprising:
   detecting, by the radio frequency identification reader of the wireless device, a radio frequency signal emitted by a second radio frequency identification tag of a second host computing system; and
   initiating, by the wireless device, pairing of the wireless device with the second host computing system using pairing information encoded in the second radio frequency identification tag, without further input from a user of the wireless device; and
   establishing a connection between the wireless device and the second host computing system using a non-radio frequency identification wireless communication protocol to facilitate an exchange of data between the wireless device and the second host computing system.

5. The method of claim 4, further comprising:
   terminating the connection between the wireless device and the first host computing system prior to initiating the pairing of the wireless device with the second host computing system.

6. The method of claim 1, wherein the first radio frequency identification tag is a pre-programmed passive tag.

7. The method of claim 6, wherein the connection comprises a one-way channel from the first host computing system to the wireless device.

8. The method of claim 1, further comprising:
   storing the pairing information in a memory of the wireless device for establishing a future connection between the wireless device and the first host computing system.

9. The method of claim 1, wherein the pairing information comprises a personal identification number for the first host computing system.

10. The method of claim 1, wherein the non-radio frequency identification wireless communication protocol is a BLUETOOTH protocol.

11. The method of claim 1, wherein the non-radio frequency identification wireless communication protocol is a WiFi protocol.

12. The method of claim 1, wherein the non-radio frequency identification wireless communication protocol is a Wireless Gigabit Alliance protocol.

13. The method of claim 1, wherein the non-radio frequency identification wireless communication protocol is a near-field communications protocol.

14. A non-transitory machine-readable storage medium encoded with instructions executable by a processor of a wireless device, the machine-readable storage medium comprising:
   instructions to extract, by a radio frequency identification reader of the wireless device, pairing information from a first radio frequency identification tag of a first host computing system;
   instructions to initiate pairing of the wireless device with the first host computing system using the pairing information, without further input from a user of the wireless device; and
   instructions to establish a connection between the wireless device and the first host computing system using a non-radio frequency identification wireless communication protocol to facilitate an exchange of data between the wireless device and the first host computing system,
   wherein the radio frequency identification tag is embedded in a first display device of a plurality of display devices coupled to the first host computing system, and the pairing pairs the wireless device with the first display device.

15. The non-transitory machine-readable storage medium of claim 14, wherein the pairing information comprises a broadcast identifier for the first host computing system.

16. The non-transitory machine-readable storage medium of claim 14, wherein the extracting is triggered by the wireless device being moved within a range of the first radio frequency identification tag.

17. The non-transitory machine-readable storage medium of claim 14, further comprising:

instructions to detect, by the radio frequency identification reader of the wireless device, a radio frequency signal emitted by a second radio frequency identification tag of a second host computing system; and instructions to initiate pairing of the wireless device with the second host computing system using pairing information encoded in the second radio frequency identification tag, without further input from a user of the wireless device; and instructions to establish a connection between the wireless device and the second host computing system using a non-radio frequency identification wireless communication protocol to facilitate an exchange of data between the wireless device and the second host computing system.

18. The non-transitory machine-readable storage medium of claim 17, further comprising:

instructions to terminate the connection between the wireless device and the first host computing system prior to initiating the pairing of the wireless device with the second host computing system.

19. An apparatus, comprising:

a radio frequency identification reader to extract pairing information from a first radio frequency identification tag of a first host computing system;

a processor to automatically initiate pairing of the apparatus with the first host computing system using the pairing information; and a wireless communication device to establish a connection between the apparatus and the first host computing system using a non-radio frequency identification wireless communication protocol, wherein the radio frequency identification tag is embedded in a first display device of a plurality of display devices coupled to the first host computing system, and the pairing pairs the wireless device with the first display device.

20. The apparatus of claim 19, wherein the apparatus is a wireless stylus.

* * * * *